Figure 1:
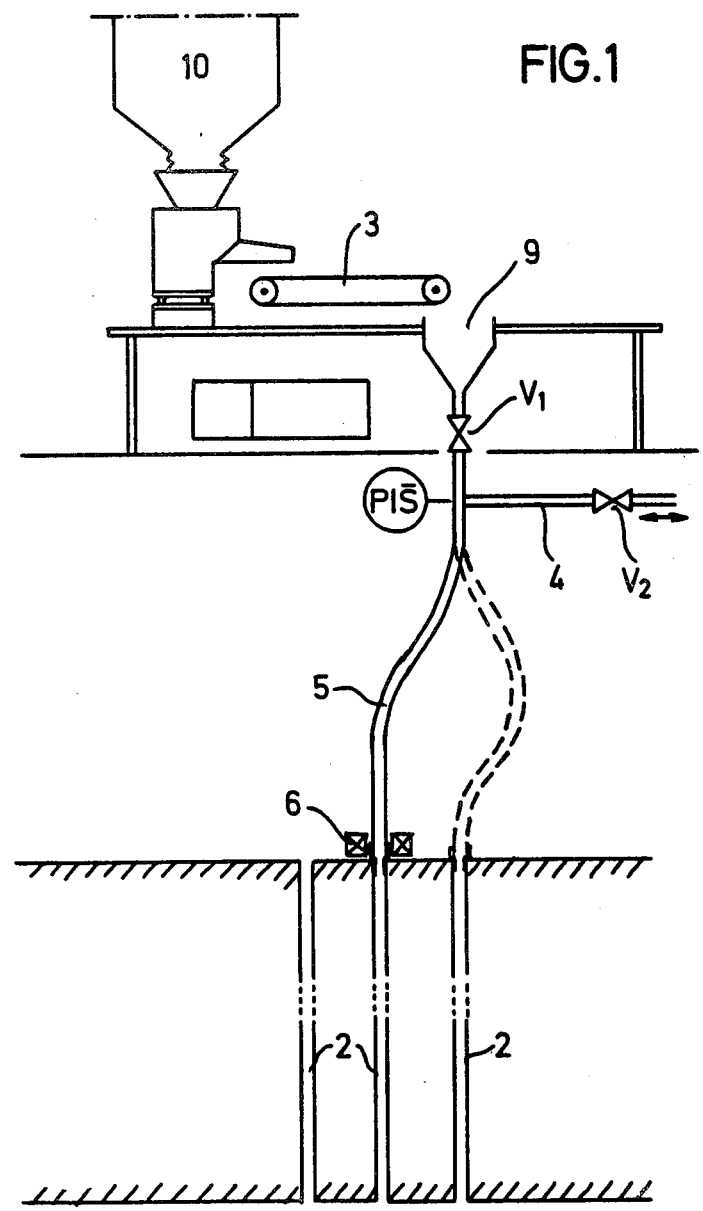

United States Patent [19]

Magin et al.

[11] Patent Number: 4,461,327

[45] Date of Patent: Jul. 24, 1984

[54] PROCESS AND ARRANGEMENTS FOR CHARGING A TUBULAR REACTOR WITH GRANULAR SOLIDS

[75] Inventors: Rudolf Magin, Schifferstadt; Franz Nenninger, Heidelberg; Gerd-Juergen Engert, Ludwigshafen, all of Fed. Rep. of Germany

[73] Assignee: BASF Aktiengesellschaft, Fed. Rep. of Germany

[21] Appl. No.: 267,869

[22] Filed: May 28, 1981

[30] Foreign Application Priority Data

Jun. 2, 1980 [DE] Fed. Rep. of Germany ....... 3020845

[51] Int. Cl.$^3$ .............................................. B65B 1/04
[52] U.S. Cl. ......................................... 141/1; 141/93; 141/95; 141/286
[58] Field of Search ...................... 141/95, 96, 98, 192, 141/197, 383, 392, 1, 93, 286; 222/56, 64

[56] References Cited

U.S. PATENT DOCUMENTS

| | | | |
|---|---|---|---|
| 3,627,555 | 12/1971 | Driscoll | 222/64 |
| 3,788,368 | 1/1974 | Geng et al. | 141/286 |
| 3,968,904 | 7/1976 | Neville | 222/64 |
| 4,163,464 | 8/1979 | Velling et al. | 141/392 |
| 4,191,223 | 3/1980 | Bourgeois | 141/392 |

FOREIGN PATENT DOCUMENTS 2849664  11/1978  Fed. Rep. of Germany .

Primary Examiner—Sal Cangialosi
Attorney, Agent, or Firm—Keil & Witherspoon

[57] ABSTRACT

A process and device for charging a plurality of tubes in a tube reactor with granular solids, preferably with catalysts, which, for this purpose, are fed from one or more stock vessels to a controllable metering device and from there, via guiding and directing devices and flexible hose connections, successively into the tubes to be filled, wherein, during the packing of the tubes, a stream of gas of constant amount is generated, which can, after an individual tube has been packed, be passed temporarily, via one or more controllable valves, through this packed tube, a pressure drop measurement being carried out at the same time and the differential between the measured value and the predetermined intended value being used to determine a small additional amount of packing material which is subsequently introduced into the tube which has been subjected to measurement, and wherein thereafter a program control triggers the mechanical packing of the next tube, metered in the same manner, with subsequent pressure drop measurement and metering of the additional amount.

6 Claims, 2 Drawing Figures

PROCESS AND ARRANGEMENTS FOR CHARGING A TUBULAR REACTOR WITH GRANULAR SOLIDS

The present invention relates to a process for mechanically charging a plurality of tubes in tube reactors with granular solids, preferably with catalysts, which process employs a controllable metering device and in particular employs the interpolation of programable pressure-drop measurements on all tubes individually in succession, after the principal amount has been introduced, and a control adjustment, resulting from each individual measurement, of the metering device, in order to introduce the correct residual amount, and to arrangements for carrying out this process.

German Patent Application No. P 2,849,664 describes a process by means of which granular solids, preferably catalysts, are introduced into the reactor tubes by means of continuously conveying and controllable metering devices, for example metering-type belt weighers, via a conduit; the process can be carried out not only with homogeneous solids but also, in a program-controlled manner, with mixed solids of different character.

In spite of the high reproducibility of this mechanical filling and metering process, substantial variations in the pressure drop in individual packed tubes are encountered when packing large industrial reactors. This is essentially attributable to two causes: to pack large industrial tube reactors, the amount of catalyst required is about 50 tonnes or more. In the production of such large amounts of catalyst, slight differences in physical properties, for example in bulk density, surface roughness, resistance to breaking etc., necessarily arise. In an industrial tube reactor with, for example, up to 40,000 individual tubes, it is furthermore virtually impossible to use tubes which all have exactly the same internal diameter. For example, in tube reactors for the acrylic acid process, the tube dimension tolerance is ±1.5%, and according to DIN specifications even ±2.5% is permissible.

Since substantial differences in the pressure drop in the individual tubes must, for technological reasons, not occur, two additional process steps have hitherto been necessary after complete packing of the reactor, namely pressure difference measurements on the individual tubes, and an equalization of the pressure, with the aim of setting up identical pressure drops for all the tubes. These process steps require personnel, and expenditure of time, to an extent comparable with the actual filling process, ie., for example, about 700 man hours per reactor.

It is an object of the present invention to supplement the mechanical process for the accelerated packing of tube reactors, disclosed in the application referred to above, with mechanical means for pressure drop equalization during the actual packing process, so that an additional pressure balancing after complete packing of the reactor becomes unnecessary.

According to the invention, this object is achieved by a process wherein, during the packing of the tubes, a stream of gas of constant amount is generated, which can, after an individual tube has been packed, be passed temporarily, via one or more controllable valves, through this packed tube, a pressure drop measurement being carried out at the same time and the differential between the measured value and the predetermined intended value being used to determine a small additional amount of packing material which is subsequently introduced into the tube which has been subjected to measurement, and wherein thereafter a program control triggers the mechanical packing of the next tube, metered in the same manner, with subsequent pressure drop measurement and metering of the additional amount.

The process according to the invention is based on the gravimetric metering—disclosed in the publication referred to at the outset—of the solid to be packed into the tubes. The requirement that this solid should be a homogeneous packing instead of a variable mixed packing can be met by carrying out the packing process continuously and in particular introducing the packing material at a constant mass flow rate into the tubes via the gravimetrically operating metering device. A particularly suitable metering device is a metering belt-weigher or a comparable gravimetrically conveying metering system with a wide adjustment range for the mass flow which is to be varied.

Two different arrangements can be used to carry out the process.

Arrangement 1, as shown in FIG. 1 of the drawings, is employed if, for packing the reactor tube bundle, only the top of the reactor is accessible. In the arrangement 2 shown in FIG. 2, the reactor must be accessible both from the top and from the bottom. In certain cases, arrangement 2 can offer advantages because fine abraded dust from the solid to be packed into the reactor can be removed in a filter.

Packing Process According to Arrangement I

The entire equipment is shown diagrammatically in FIG. 1. The packing takes place as follows:

1. Main metering

The reactor tube (2) is packed, at a constant mass flow rate $\dot{m}_1$ of the packing, provided by the metering belt-weigher 3, for a predetermined time $T_1$.

$\dot{m}_1$ and $T_1$ are selected so that the amount packed into the tube, namely $M_1 = \dot{m}_1 \cdot T_1$ is somewhat less than the total packing M.

$$M = \int_o^T \dot{m}(t)\,dt;\ M_1 < M,$$

where T=total packing time per tube and M=total amount of packing per tube. $M_1$ should be only slightly less than M and is advantageously established experimentally.

2. At the end of the packing time $T_1$ of each individual tube 2, the valve $V_1$ is closed and the valve $V_2$ is opened briefly. A stream of gas, which is kept constant by means of a flow regulator, then passes through the amount $M_1$, packed into the tube, via the nozzle 4. The lower orifice of the tube 2 being packed is directly connected to the atmosphere. The pressure set up above the packing introduced into the tube 2, namely the effective pressure $p_e$, corresponds to the pressure drop caused by the packing $M_1$. The measured value $p_1$ is compared with a predetermined intended value p which corresponds to the amount M, and the amount of packing $M-M_1$ which still requires to be metered in is calculated. The relationship between $p-p_1$ and $M-M_1$ is approximately linear.

3. The shortfall amount $M-M_1$ is metered in. To do this, the program control, which influences the timing of the entire arrangement, is used to vary the speed of the metering belt-weigher 3, ie. the weigher is employed for precision metering. For this purpose, it is particularly advantageous if the metering belt-weigher employed has a particularly large adjustment range and settles very quickly, rather than resorting to the alternative of having a rough metering device and precision metering device. For rough metering and precision metering, the metering belt-weigher is actuated in the form of a start-stop operation, for which a program control of a conventional type is produced.

4. After completion of process 3, ie. at the end of time T, a controlled pressure measurement above the packing in tube 2 is carried out, corresponding to the conditions described above in section 2. If the measured value deviates from the intended value p by more than a certain tolerance, a signal is generated as part of the program control.

In order to be able to measure the pressure drop occurring at the packing in any particular tube 2 as accurately as possible, a gas-tight seal is needed between the upper end of the reactor tube and the filling nozzle of the flexible fabric hose 5, by means of which the discharge line below the valve V1 is successively connected to the tubes 2 which are to be filled. In the simplest case, this is achieved by manually pressing down the filling nozzle, a soft gasket being interposed. The process can be automated by providing an electromagnet 6 which annularly surrounds the conical filling nozzle and which, for the duration of the pressure measurement, presses this nozzle onto the end of the reactor tube 2. This electromagnet 6 is actuated by the program control.

Figure 2:
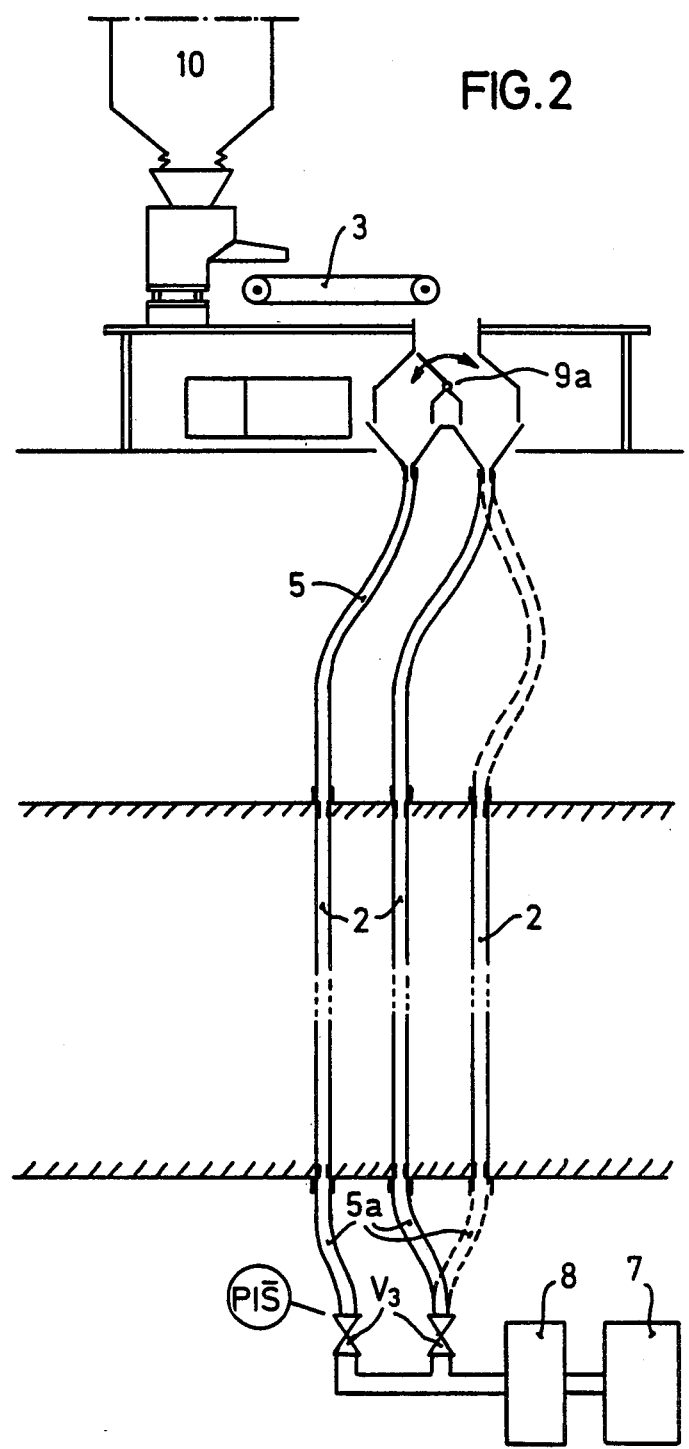

Filling Process According to Arrangement II (FIG. 2)

The filling and metering system for the reactor tubes 2, which consists of the controllable metering belt-weigher 3 and flexible fabric hoses 5 leading to the reactor tubes, is the same as in arrangement I. In the present case, however, the device which generates the constant stream of gas, preferably a flow-controlled suction pump 7, is connected to the underside of the reactor. The sealing of the flexible hoses 5a against the lower ends of the tubes 2 is effected as in arrangement I. Each tube 2 is charged with the solid until a predetermined pressure drop over the packing is reached at the tube. It is advantageous if the pressure-measuring device PIS is provided with two or more switch contacts, using which successive principal metering and precision metering by means of the metering belt-weigher 3 can be effected. This achieves greater accuracy of metering and the hold-up in the metering system, which, as an overrun, enters the particular tube 2 as additional packing can be kept very small.

In order to keep the entire system substantially free of fine abraded dust from the solid being packed into the tubes, it is advisable to lead the stream of gas from the top of the reactor to the underside of the reactor, ie. to install a vacuum generator 7 with flow regulator on the underside of the reactor. A dust separator 8 can then be installed on this suction side of the vacuum system (FIG. 2).

With both arrangements (I and II) it is possible, by means of a guiding and directing device 9, which comprises a shunt 9a, to have a plurality of filling systems underneath the metering belt-weigher 3. FIG. 2 shows such a twin arrangement diagrammatically. In such a case, the shunt 9a must be linked into the central program control.

We claim:

1. A process for charging a plurality of tubes in a tube reactor with granular catalysts, which, for this purpose, are fed from at least one stock vessel to a controllable metering device and from there, via guiding and directing devices and flexible hose connections, successively into the tubes to be filled, wherein, during the packing of the tubes (2), a stream of gas of constant amount is generated, which can, after an individual tube has been packed, be passed temporarily, via one or more controllable valves, through this packed tube, a pressure drop measurement being carried out at the same time and the differential between the measured value and the predetermined intended value being used to determine a small additional amount of packing material which is subsequently introduced into the tube which has been subjected to measurement, and wherein thereafter a program control triggers the mechanical packing of the next tube, metered in the same manner, with subsequent pressure drop measurement and metering of the additional amount.

2. The process of claim 1, wherein a metering belt-weigher with a short settling time and a wide adjustment range is used as the gravimetric metering device for the principal amount and residual amount of the packing to be introduced successively into the tubes.

3. The process of claim 1, wherein the constant-amount stream of gas which is temporarily to be passed through individual pre-packed tubes is introduced, as a stream under pressure, via a nozzle (4) which opens into the discharge line of a guiding and directing device (9) for the packing material and possesses a controllable valve (V2), in such a way that on opening this valve (V2) a further valve (V1) in the discharge line is closed simultaneously, the pressure measurement (PIS) taking place above the packing in the particular tube.

4. The process of claim 1, wherein the constant-amount stream of gas, to be passed temporarily through successive prepacked tubes (2) is generated as a suction stream and one or more valves (V3), to be opened temporarily for carrying out the suction measurement, are located at the lower end of the tubes (2).

5. The process of claim 4, wherein a filter (8) for abraded dust from the packing is located in the line (5a) which connects a suction pump (7), via the valves (V3), with the lower ends of the tubes (2).

6. The process of claim 3 or 4 or 5, wherein pressure-measuring instruments (PIS) with switch contacts are used, by means of which contacts the adjustment range of the metering device (3) is automatically variable to suit the remaining amount of packing to be introduced by precision metering.

* * * * *